US008170366B2

(12) United States Patent
Ostromek et al.

(10) Patent No.: US 8,170,366 B2
(45) Date of Patent: May 1, 2012

(54) IMAGE PROCESSING USING OPTICALLY TRANSFORMED LIGHT

(75) Inventors: Timothy E. Ostromek, Richardson, TX (US); Antonio V. Bacarella, Dallas, TX (US)

(73) Assignee: L-3 Communications Corporation, New York, NY (US)

( * ) Notice: Subject to any disclaimer, the term of this patent is extended or adjusted under 35 U.S.C. 154(b) by 2174 days.

(21) Appl. No.: 10/699,985

(22) Filed: Nov. 3, 2003

(65) Prior Publication Data

US 2005/0094270 A1     May 5, 2005

(51) Int. Cl.
  *G06K 9/36*       (2006.01)
  *G03H 1/16*       (2006.01)
  *G02B 27/46*      (2006.01)
(52) U.S. Cl. .......... 382/276; 382/280; 382/284; 359/29; 359/559
(58) Field of Classification Search .................. 382/280, 382/284, 276; 359/559, 29
  See application file for complete search history.

(56) References Cited

U.S. PATENT DOCUMENTS

| | | | | |
|---|---|---|---|---|
| 4,213,036 A * | 7/1980 | Kopp et al. | ............ | 382/133 |
| 4,308,521 A | 12/1981 | Casasent et al. | ............ | 382/254 |
| 4,462,046 A * | 7/1984 | Spight | ............ | 348/94 |
| 4,637,055 A * | 1/1987 | Taylor | ............ | 382/133 |
| 5,096,281 A | 3/1992 | Windebank et al. | ............ | 359/868 |
| 5,151,822 A | 9/1992 | Hekker et al. | ............ | 359/559 |
| 5,216,541 A * | 6/1993 | Takesue et al. | ............ | 359/561 |
| 5,224,174 A * | 6/1993 | Schneider et al. | ............ | 382/124 |
| 5,537,669 A * | 7/1996 | Evans et al. | ............ | 382/141 |
| 5,732,147 A | 3/1998 | Tao | ............ | 382/110 |
| 5,751,395 A | 5/1998 | Thall | ............ | 351/221 |
| 5,877,876 A | 3/1999 | Birdwell | ............ | 349/39 |
| 5,880,813 A | 3/1999 | Thall | ............ | 351/221 |
| 5,960,098 A | 9/1999 | Tao | ............ | 382/110 |
| 5,963,667 A * | 10/1999 | Hashimoto et al. | ............ | 382/190 |
| 6,271,520 B1 | 8/2001 | Tao et al. | ............ | 250/330 |
| 6,421,454 B1 | 7/2002 | Burke et al. | | |
| 6,437,762 B1 | 8/2002 | Birdwell | ............ | 345/48 |
| 6,549,650 B1 * | 4/2003 | Ishikawa et al. | ............ | 382/154 |

(Continued)

FOREIGN PATENT DOCUMENTS

JP       05035926 A * 2/1993

OTHER PUBLICATIONS

Shaoyuan S. et al., "Fusion in Frequency-Domain of Instantaneous Laser Assistant Vision Image and Low Light Level Image," Proceedings of SPIE vol. 4222, Nov. 8, 2000, pp. 267-271.
S. Horn et al., "Fused Reflected/Emitted Light Sensors," Proceedings of SPIE vol. 4369, Apr. 16, 2001, pp. 1-13.
International Search Report issued for PCT/US2004/035487, dated Feb. 15, 2005.

*Primary Examiner* — Bernard Krasnic
(74) *Attorney, Agent, or Firm* — Marsteller & Associates P.C.

(57) ABSTRACT

Processing image information includes receiving light having image information. A first optical transform is performed on the light to yield a first optically transformed light, and a second optical transform is performed on the light to yield a second optically transformed light. A first metric is generated in accordance with the first optically transformed light, and a second metric is generated in accordance with the second optically transformed light. The first metric and the second metric are processed to yield a processed metric. An inverse optical transform is performed on the processed metric to process the image information of the light.

16 Claims, 1 Drawing Sheet

U.S. PATENT DOCUMENTS

| | | | |
|---|---|---|---|
| 6,567,566 B1 * | 5/2003 | Grycewicz | 382/278 |
| 6,610,953 B1 | 8/2003 | Tao et al. | 209/577 |
| 7,095,540 B1 * | 8/2006 | Javidi et al. | 359/29 |
| 7,187,810 B2 * | 3/2007 | Clune et al. | 382/294 |
| 2002/0181781 A1 * | 12/2002 | Javidi et al. | 382/210 |
| 2004/0037462 A1 * | 2/2004 | Lewis et al. | 382/181 |

* cited by examiner

IMAGE PROCESSING USING OPTICALLY TRANSFORMED LIGHT

TECHNICAL FIELD OF THE INVENTION

This invention relates generally to the field of electro-optical systems and more specifically to image processing using optically transformed light.

BACKGROUND OF THE INVENTION

Electro-optical systems may generate an image by processing image information. Known electro-optical systems, however, typically cannot efficiently and effectively process image information from multiple sensors. Consequently, known electro-optical systems for generating an image may be unsatisfactory in certain situations.

SUMMARY OF THE INVENTION

In accordance with the present invention, disadvantages and problems associated with previous techniques for generating an image may be reduced or eliminated.

According to one embodiment of the present invention, processing image information includes receiving light having image information. A first optical transform is performed on the light to yield a first optically transformed light, and a second optical transform is performed on the light to yield a second optically transformed light. A first metric is generated in accordance with the first optically transformed light, and a second metric is generated in accordance with the second optically transformed light. The first metric and the second metric are processed to yield a processed metric. An inverse optical transform is performed on the processed metric to process the image information of the light.

Certain embodiments of the invention may provide one or more technical advantages. A technical advantage of one embodiment may be that light is optically transformed to generate metrics that are processed. The processed metrics are inversely optically transformed to generate an image. By optically transforming light, image information may be efficiently processed.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
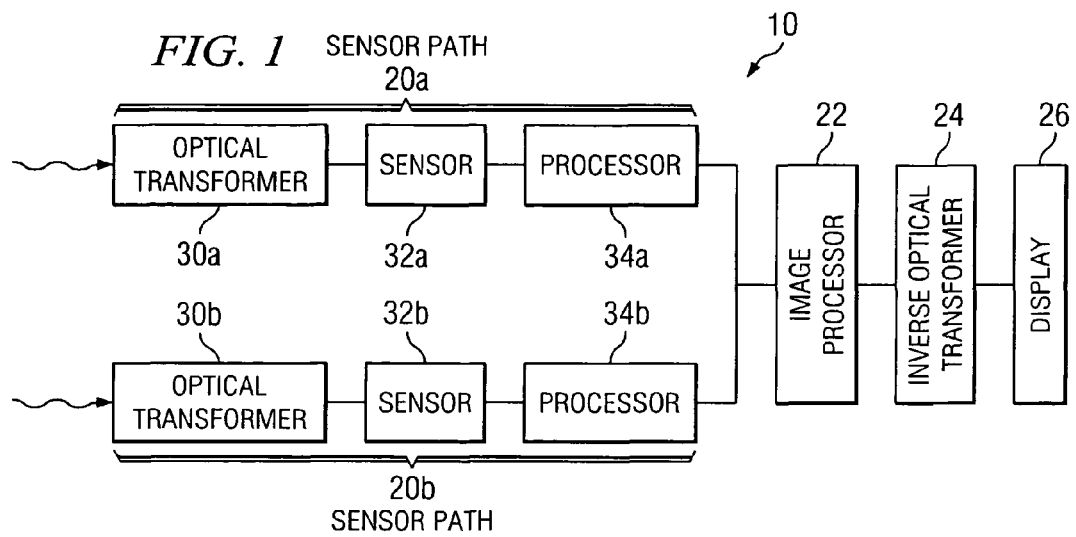
FIG. 1 is a block diagram illustrating one embodiment of a system for processing image information.
Figure 2:
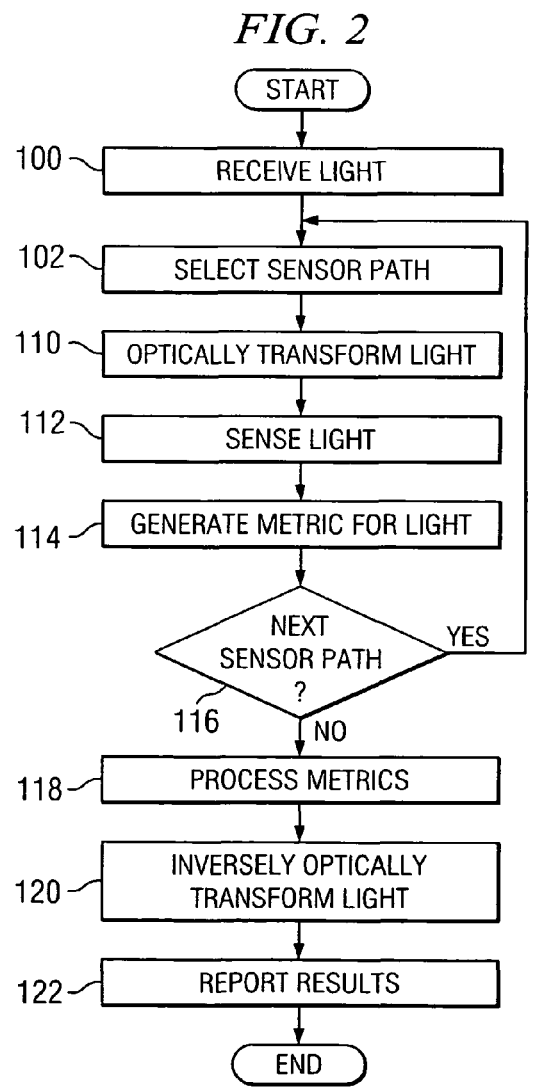
FIG. 2 is a flowchart illustrating one embodiment of a method for processing image information.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system for processing image information. System 10 receives light that includes image information. The light is optically transformed and received by a plurality of sensors. Metrics describing the optically transformed light are processed in order to generate an image from the image information.

According to the illustrated embodiment, system 10 includes sensor paths 20*a-b*, an image processor 22, and inverse optical transformer 24, and a display 26 coupled as illustrated in FIG. 1. System 10 receives light reflected from an object. The light carries image information that may be used to generate an image of the object. Sensor paths 20*a-b* optically transform the received light and generate metrics that describe the optically transformed light. Image processor 22 processes the metrics in order to yield a processed metric. Inverse optical transformer 24 performs an inverse optical transform on the processed metric in order to generate an image that may be displayed at display 26.

According to one embodiment, sensor path 20*a-b* includes an optical transformer 30*a-b*, a sensor 32*a-b*, and a processor 34*a-b* coupled as illustrated in FIG. 1. Optical transformer 30*a-b* may comprise any device operable to perform an optical transform on light, for example, a lens, a filter, or an electro-optical element. The optical transform may comprise a Fourier or Fourier-based transform, a geometrical transform, or any other suitable transform.

Optical transforms may be used to identify and represent features of an image. For example, a Fourier transform comprises a series expansion of an image function in terms of cosine image basis functions that expresses an image as a summation of cosine-like images. A geometrical transform represents geometric features of an image as different geometric features. According to one embodiment, optical transforms may be used to express the length and width of a shape in an image as a ratio. According to another embodiment, optical transforms may be used to express the eccentricity of a shape in an image as a numerical value. According to yet another embodiment, optical transforms may be used to represent a predetermined shape of an image such as the shape of a missile as a circle. Optical transforms may be formulated such that the transformed image may be more easily identified.

The optical transforms performed by optical transformers 30*a-b* may be substantially similar or may be compatibly different. Compatibly different optical transforms may comprise different optical transforms that do not cancel each other out. For example, an optical transform performed by optical transformer 30*a* may target a specific shape, while an optical transform performed by optical transformer 30*b* may target heat.

Sensor 32*a-b* senses the optically transformed light to generate a signal such as a digital or analog signal that describes the image information of the light. Sensor 32*a-b* may detect certain types of energy of the light, for example, infrared energy. Sensor 32*a-b* may comprise, for example, a charge-coupled device (CCD), a lead salt sensor, or other suitable sensing device embodied in any suitable manner such as in a pixel or in a pixel array.

Processor 34*a-b* receives a signal from sensor 32*a-b* and generates a metric in response to the signal. As used in this document, the term "processor" refers to any suitable device operable to accept input, process the input according to predefined rules, and produce output. A metric may comprise, for example, a matrix that describes particular features of an image. The particular features may include, for example, the average spatial frequency of an area, the longest edge of an image, or the circles of an image. Optically transforming a light may yield metrics that are more easily analyzed. Typically, optically transforming the light may correlate image information for more efficient analysis.

Image processor 22 processes the metrics received from sensor path 20a-b to generate a processed metric. Image processor 22 may perform any suitable type of image processing. For example, image processor may fuse the metrics to form a fused image. The metrics may be fused by selecting data from each metric, and then forming a processed metric from the selected data. The data may be selected based upon which metric includes the most image content. "Each" as used in this document refers to each member of a set or each member of a subset of a set.

Metrics $m_1$ and $m_2$ may be fused according to a function $f(m_1, m_2)$ of metrics $m_1$ and $m_2$. For example, the metrics $m_1$ and $m_2$ may be fused according to the function $f(m_1,m_2)=m_1+m_2$ or other suitable function. The function $f(m_1,m_2)$ may combine the metrics according to weights assigned to the metrics. For example, the metrics may be combined according to the function $f(m_1,m_2)=w_1\ m_1/w_2\ m_2$ or the function $f(m_1,m_2)=w_1\ m1+w_2\ m_2$, where $w_1$ represents a weight assigned to metric $m_1$, and $w_2$ represents a weight assigned to metric $m_2$. Any other function or procedure for combining the metrics, however, may be used.

As another example, image processor 22 may locate a target using the metrics received from sensor paths 20a-b. The metrics may be designed to identify certain shapes such as circles or edges of an image, and image processor 22 may locate targets that include the identified shapes. Image processor 22, however, may perform any other suitable processing such as industrial sorting.

Image processor 22 may make compatible different types of data received from sensor paths 20a-b. For example, image processor 22 may be used to make compatible different resolutions of sensors 32a-b. As an example, sensor 32a may have an image area that has 60,000 pixels, while sensor 32b may have an image area that has 1 million pixels. Image processor 22 may be used to efficiently normalize the different resolutions.

Inverse optical transformer 24 performs the inverse of the optical transforms performed by sensor paths 20a-b. If different optical transforms are performed by different sensor paths 20a-b, different inverse optical transforms may be performed on the processed metric in order to invert the data. The inverse optical transform may be performed in parallel, and may be performed in a relatively predictable amount of time.

Display 26 displays an image generated from an inverted metric received from image processor 24. Display 26 may include any device or combination of devices suitable for displaying an image. For example, display 26 may include a television monitor, a video enabled eyepiece, or a handheld display.

Modifications, additions, or omissions may be made to system 10 without departing from the scope of the invention. For example, system 10 may include any suitable number of sensor paths 20a-b, and may include more or fewer than two sensor paths 20a-b. Moreover, the operation of the system may be performed by more or fewer modules. For example, the operation of image processor 22 and inverse optical transformer 24 may be performed by one module, or the operation of image processor 22 may be performed by more than one module. Additionally, functions may be performed using any suitable logic comprising software, hardware, other logic, or any suitable combination of the preceding.

FIG. 2 is a flowchart illustrating one embodiment of a method for processing image information. According to the embodiment, light carrying image information is received. The received light is optically transformed to generate metrics that are processed in order to yield a processed metric. An inverse optical transform is performed on the processed metric in order to generate an image that may be displayed.

The method begins at step 100, where system 10 receives light carrying image information that may be used to generate an image of an object. Steps 102 through 114 may be performed for each sensor path 20a-b of system 10, and the sequences of steps 102 through 114 for the sensor paths 20a-b may be performed concurrently. A sensor path 20a is selected at step 102. Optical transformer 30a optically transforms the received light at step 110. Optically transforming a light may yield metrics that may be more efficiently processed. Typically, optically transforming the light correlates the data for more efficient analysis.

Sensor 32a senses the optically transformed light at step 112, and generates a signal in response to sensing the light. Processor 34a generates a metric for the light at step 114 in response to the signal received from sensor 32a. A metric may comprise, for example, a matrix that describes particular features of the image such as the average spatial frequency of an area, the longest edge of an image, or the circles of an image.

If there is a next sensor path 20b at step 116, the method returns to step 102 to select the next sensor path 20b. If there is no next sensor path at step 116, the method proceeds to step 118. Image processor 22 processes the metrics received from processors 34a-b to generate a processed metric. Image processor 22 may, for example, fuse the metrics or may use the metrics to locate a target. Inverse optical transformer 24 inversely optically transforms the processed metric at step 120 in order to invert the data. Display 26 reports the results at step 122. After reporting the results, the method terminates.

Modifications, additions, or omissions may be made to the method without departing from the scope of the invention. For example, additional or other suitable filtering or processing may be performed at any step of the method. Additionally, steps may be performed in any suitable order without departing from the scope of the invention.

Certain embodiments of the invention may provide one or more technical advantages. A technical advantage of one embodiment may be that light is optically transformed to generate metrics that are processed. The processed metrics are inversely optically transformed to generate an image. By optically transforming light, image information may be efficiently processed.

Although an embodiment of the invention and its advantages are described in detail, a person skilled in the art could make various alterations, additions, and omissions without departing from the spirit and scope of the present invention as defined by the appended claims.

What is claimed is:

1. A method for processing image information, comprising:

receiving light comprising image information;

performing a first optical transform on the light to yield a first optically transformed light;

performing a second optical transform on the light to yield a second optically transformed light;

generating a first metric in accordance with the first optically transformed light;

generating a second metric in accordance with the second optically transformed light;

processing the first metric and the second metric to yield a processed metric;

performing an inverse optical transform on the processed metric to process the image information of the light;

generating an image from the processed metric; and displaying the image.

2. The method of claim 1, wherein the first optical transform is substantially similar to the second optical transform.

3. The method of claim 1, wherein the first optical transform is compatibly different from the second optical transform, such that the first and second optical transforms each target different aspects of the image information.

4. The method of claim 1, wherein:
the first optical transform comprises a first Fourier transform; and
the second optical transform comprises a second Fourier transform.

5. The method of claim 1, wherein processing the first metric and the second metric to yield a processed metric comprises:
selecting first data from the first metric;
selecting second data from the second metric; and
fusing the first data and the second data to yield the processed metric.

6. The metric of claim 1, wherein processing the first metric and the second metric to yield a processed metric comprises:
generating the processed metric in response to the first metric and the second metric; and
detecting a target using the processed metric.

7. A system for processing image information, comprising:
a plurality of optical transformers for receiving light comprising image information, a first optical transformer for performing a first optical transform on the light to yield a first optically transformed light, a second optical transformer for performing a second optical transform on the light to yield a second optically transformed light;
a first processor for generating a first metric in accordance with the first optically transformed light;
a second processor for generating a second metric in accordance with the second optically transformed light;
an image processor for processing the first metric and the second metric to yield a processed metric;
an inverse optical transformer for performing an inverse optical transform on the processed metric to process the image information of the light;
generate an image from the processed metric; and
display the image.

8. The system of claim 7, wherein the first optical transform is substantially similar to the second optical transform.

9. The system of claim 8, wherein the first optical transform is compatibly different from the second optical transform, such that the first and second optical transforms each target different aspects of the image information.

10. The system of claim 7, wherein:
the first optical transform comprises a first Fourier transform; and
the second optical transform comprises a second Fourier transform.

11. The system of claim 7, wherein the image processor processes the first metric and the second metric to yield a processed metric by:
selecting first data from the first metric;
selecting second data from the second metric; and
fusing the first data and the second data to yield the processed metric.

12. The system of claim 7, wherein the image processor processes the first metric and the second metric to yield a processed metric by:
generating the processed metric in response to the first metric and the second metric; and
detecting a target using the processed metric.

13. A system for processing image information, comprising:
means for receiving light comprising image information;
means for performing a first optical transform on the light to yield a first optically transformed light;
means for performing a second optical transform on the light to yield a second optically transformed light;
means for generating a first metric in accordance with the first optically transformed light;
means for generating a second metric in accordance with the second optically transformed light;
means for processing the first metric and the second metric to yield a processed metric;
means for performing an inverse optical transform on the processed metric to process the image information of the light; and
means for reporting results.

14. A method for processing image information, comprising:
receiving light comprising image information;
performing a first optical transform on the light to yield a first optically transformed light, the first optical transform comprising a first Fourier transform;
performing a second optical transform on the light to yield a second optically transformed light, the second optical transform comprising a second Fourier transform, the first optical transform substantially similar to the second optical transform or compatibly different from the second optical transform;
generating a first metric in accordance with the first optically transformed light;
generating a second metric in accordance with the second optically transformed light;
processing the first metric and the second metric to yield a processed metric by performing a procedure selected from the group consisting of a first procedure and a second procedure, the first procedure comprising: selecting first data from the first metric, selecting second data from the second metric, and fusing the first data and the second data to yield the processed metric, and second procedure comprising: generating the processed metric in response to the first metric and the second metric, and detecting a target using the processed metric;
performing an inverse optical transform on the processed metric to process the image information of the light;
generating an image from the processed metric; and
displaying the image.

15. A system for performing processing upon an image, said system comprising:
a first optical transformer for performing a first optical transform on received light;
a second optical transformer for performing a second optical transform on said received light;
a first sensor in communication with said first optical transformer to sense the optically transformed light and generate a first signal describing information of the light;
a second sensor in communication with said second optical transformer to sense the optically transformed light and generate a second signal describing information of the light;
a first processor in communication with said first sensor to receive said first signal and to generate first data describing one or more features of said image;
a second processor in communication with said second sensor to receive said second signal and to generate second data describing said one or more features of said image;
a third processor receiving said first and second data and forming a fused image signal therefrom;

an inverse transformer receiving the fused image signal and performing an inverse transform for said first optical transform and a second inverse transform for said second optical transform; and a display receiving inversely transformed image data from said inverse transformer and displaying an image therefrom.

16. The system of claim 15 wherein said first and second optical transforms are selected from the group consisting of:
    a Fourier transform; and
    a geometric transform.

\* \* \* \* \*